United States Patent
Sweigard

(10) Patent No.: US 8,079,552 B2
(45) Date of Patent: Dec. 20, 2011

(54) CLIP FOR FIRE DETECTOR WIRE

(75) Inventor: Daniel J. Sweigard, Euless, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 972 days.

(21) Appl. No.: 10/509,928

(22) PCT Filed: Apr. 1, 2003

(86) PCT No.: PCT/US03/10080
§ 371 (c)(1),
(2), (4) Date: Oct. 1, 2004

(87) PCT Pub. No.: WO03/085307
PCT Pub. Date: Oct. 16, 2003

(65) Prior Publication Data
US 2005/0121561 A1 Jun. 9, 2005

(51) Int. Cl.
*F16L 3/08* (2006.01)
(52) U.S. Cl. .............. 248/74.2; 248/74.3; 248/216.7; 248/68.1; 248/316.1; 24/336; 24/545
(58) Field of Classification Search .............. 248/74.2, 248/49, 55, 65, 74.3, 74.4, 316.7, 74.1, 68.1, 248/316.1, 51; 24/336, 545, 457
See application file for complete search history.

(56) References Cited

U.S. PATENT DOCUMENTS

| | | | | |
|---|---|---|---|---|
| 1,549,142 A * | 8/1925 | Mckenzie et al. | | 24/457 |
| 1,758,712 A * | 5/1930 | Morris | | 384/296 |
| 2,266,320 A * | 12/1941 | Hobbs | | 384/276 |
| 2,376,920 A | 5/1945 | Jones | | 177/311 |
| 2,410,218 A | 10/1946 | Kelly | | 136/4 |
| 2,665,867 A * | 1/1954 | McDonald | | 248/68.1 |
| 3,303,261 A | 2/1967 | Patterson et al. | | 174/1 |
| 3,584,348 A * | 6/1971 | Soltysik | | 248/68.1 |
| 3,710,674 A * | 1/1973 | Tabor | | 411/61 |
| 4,248,459 A * | 2/1981 | Pate et al. | | 285/319 |
| 4,639,980 A | 2/1987 | Peterson | | 24/306 |
| 4,673,151 A * | 6/1987 | Pelz | | 248/74.1 |
| 5,248,119 A * | 9/1993 | Imura | | 248/65 |
| 5,277,006 A * | 1/1994 | Ruster | | 52/220.7 |
| 5,997,967 A | 12/1999 | Hawkings | | 428/34.9 |
| 6,263,954 B1 * | 7/2001 | Nakayama | | 165/67 |
| 6,393,965 B1 * | 5/2002 | Acker et al. | | 92/124 |

* cited by examiner

*Primary Examiner* — Kimberly Wood
(74) *Attorney, Agent, or Firm* — James E. Walton; Noah A. Tevis

(57) ABSTRACT

A clip assembly (111) having a clamp member (115) with opposing fingers (121 and 123) configured to form a channel, and an insert member (129) that holds the fire detector wire (128) is disclosed. The insert member (128) is made of, coated with, or treated with an anti-friction material. The insert member includes end flanges (133, 135) that retain the insert member between the opposing fingers. The fire detector wire is installed into the insert member, and the insert member is then snapped into the channel formed by the opposing fingers of the clamp member.

16 Claims, 3 Drawing Sheets

US 8,079,552 B2

CLIP FOR FIRE DETECTOR WIRE

GOVERNMENT LICENSE RIGHTS

The U.S. Government has a paid-up license in this invention and the right in limited circumstances to require the patent owner to license others on reasonable terms as provided for by the terms of Contract No. N00019-93-C-006 awarded by NAVAIR.

TECHNICAL FIELD

The present invention relates to mounting clips. In particular, the present invention relates to mounting clips for fire detector wires in aircraft.

DESCRIPTION OF THE PRIOR ART

Fire detector wires have been in used in aircraft for many years. They are installed in aircraft at selected locations to produce warning signals when fires break out or when temperatures exceed predetermined limits. These fire detector wires typically consist of two non-insulated electrical conductors in a sealed tube filled with a dielectric material or a gaseous material. If the temperature of the fire detector wire exceeds a predetermined temperature limit, the dielectric material breaks down, causing the non-insulated electrical conductors to short circuit. This short circuit is detected and a corresponding signal is sent to the cockpit to alert the pilot that the temperature in the vicinity of the fire detector wire has exceeded the predetermined limit. Any damage to the sealed tube of the fire detector wire can result in a loss of the dielectric material or the gaseous material and failure of the fire detector wire.

These fire detector wires are typically mounted to the aircraft structure with mounting clips. The purpose of the mounting clips is to prevent the fire detector wire from coming into direct contact with the aircraft structure. These mounting clips usually include a flat base portion and an upraised clamp portion. The mounting clip is installed onto the aircraft by fastening the base portion to the aircraft structure at a selected location. Then the fire detector wire is snapped into the clamp portion.

One of these mounting clips is shown in FIGS. 1A and 1B in the drawings. A prior-art clip 11 includes a flat base portion 13 and an upraised clamp portion 15. Base portion 13 includes a single mounting aperture 17 through which a fastener (not shown) passes to secure clip 11 to a structure 19 of an aircraft. Clamp portion 15 includes a plurality of opposing fingers 21, 23, and 25 that act as springs and form a channel 27 for receiving a fire detector wire (not shown). Clip 11 typically includes a surface lubricant to protect against fretting between base portion 13 and structure 19.

Other prior-art fire detector mounting clips involve loop-type clamps and hinges. These clips require complicated moving parts that must be fastened after the fire detector wire is installed. This can be a very labor intensive task, as the clips are often Installed in hard to reach places. On some of these clips, the clamping portions may be lined with rubber or plastic sleeves. These loop-type clips are very expensive and typically stand much higher than the finger-type clips.

All of these prior-art clips for fire detector wires have significant problems. For those with only one mounting aperture, the clips tend to rotate when subjected to vibration. This causes crimping and chafing of the fire detector wire. In addition, because there is not sufficient anti-friction protection between the opposing fingers and the fire detector wire, chafing of the fire detector wire can take place when the clip is subjected to vibration. For those with closed loops and hinges, they stand too high and involve too much time and labor to install.

Thus, many shortcomings remain in the area of mounting systems for fire detector wires in aircraft.

SUMMARY OF THE INVENTION

There is a need for a clip for a fire detector wire in an aircraft that does not rotate when subjected to vibration, and that provides sufficient means of preventing crimping and chafing of the fire detector wire.

Therefore, it is an object of the present invention to provide a clip for a fire detector wire in an aircraft that does not rotate when subjected to vibration, and that provides sufficient means of preventing crimping and chafing of the fire detector wire.

These objects are achieved by providing a clip assembly having a clamp member with opposing fingers configured to form a channel, and an insert member that holds the fire detector wire. The insert member is made of, coated with, or treated with an anti-friction material. The insert member includes end flanges that retain the insert member between the opposing fingers. The fire detector wire is installed into the insert member, and the insert member is then snapped into the channel formed by the opposing fingers of the clamp member.

The present invention provides significant benefits and advantages, including: (1) the clip does nor rotate relative to the aircraft structure when subjected to vibration, thereby preventing crimping and chafing of the fire detector wire; (2) the anti-friction insert member prevents chafing of the fire detector wire; (3) the end flanges of the insert member retain the insert member in the proper position between the opposing fingers of the clamp member; and (4) once the insert member is installed into the clap member, no further fastening or adjustment is required.

DESCRIPTION OF THE PREFERRED EMBODIMENT

Figure 3:
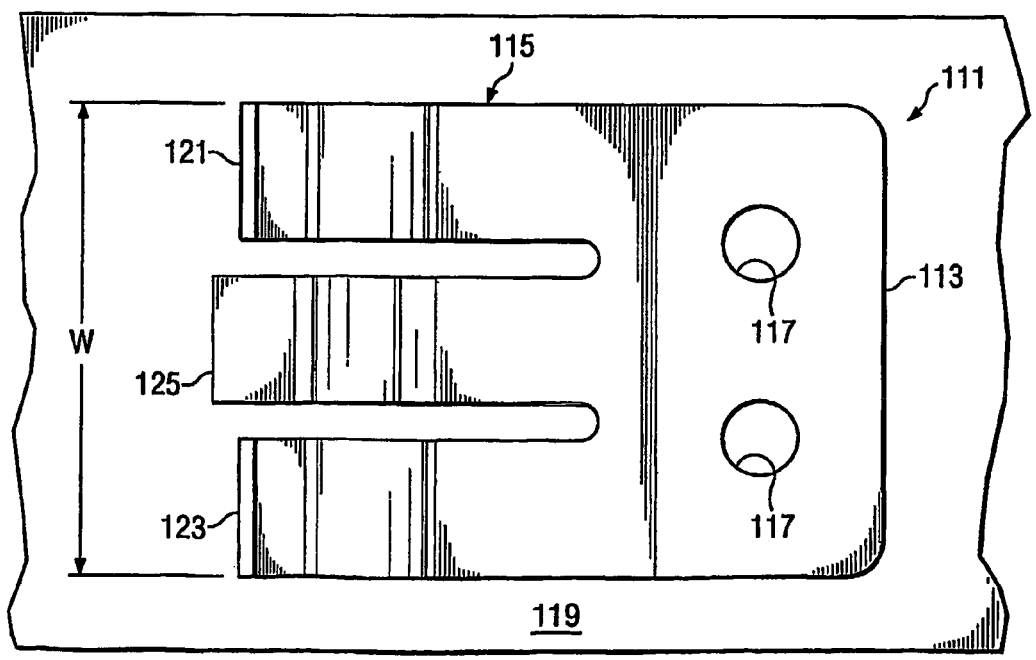
FIG. 3 is a top view of the clip member of the clip of FIG. 2.
Figure 4:
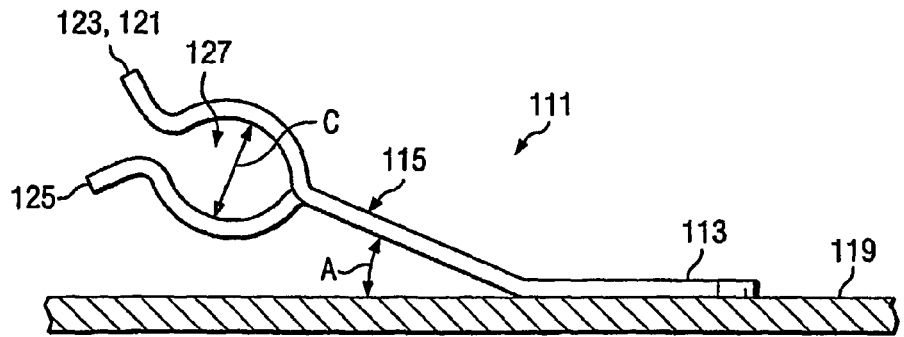
FIG. 4 is a front view of the clip member of FIG. 3.
Figure 5:
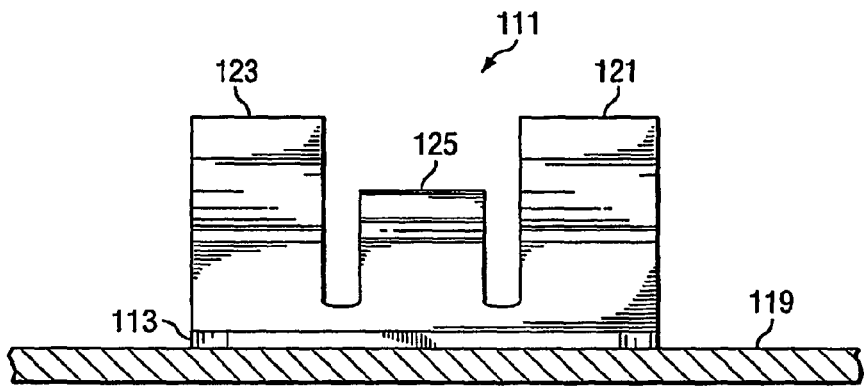
FIG. 5 is a right side view of the clip member of FIG. 3.
Figure 6:
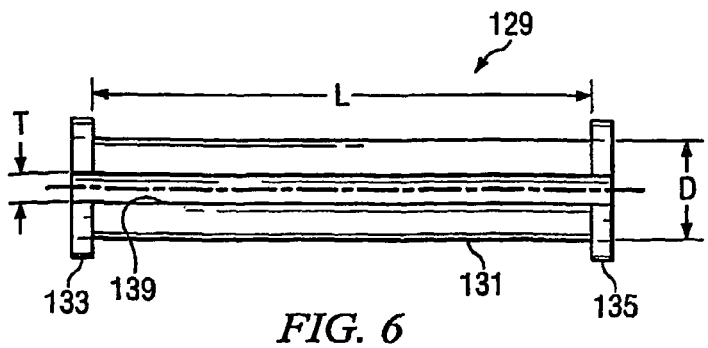
FIG. 6 is a front view of the insert member of the clip of FIG. 2.
Figure 7:
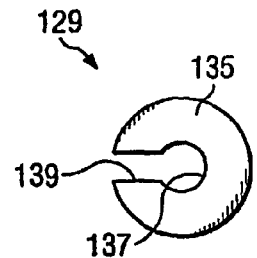
FIG. 7 is an end view of the insert member of FIG. 6.

The present invention is a clip assembly for retaining a fire detector wire. The clip assembly of the present invention is shown In assembled form FIG. 2 and comprises a clip member 111 as shown In FIGS. 3-5, and an insert member 129 as shown in FIGS. 6 and 7. Although the present Invention will be described with respect to an aircraft application, it should be understood that the clip assembly of the present invention may be used in any vehicle or structure in which it is desirable to install a fire detector wire.

Referring now to FIG. 2 and FIGS. 3-5 in the drawings, clip member 111 is illustrated. Clip member 111 includes a flat base portion 113 and an upraised clamp portion 115. Base portion 113 includes at least two mounting apertures 117 through which are passed conventional fasteners (not shown) for securing clip member 111 to an aircraft structure 119. The presence of at least two mounting apertures 117 prevents clip member 11 from rotating relative to structure 119.

Base portion 113 transitions into a clamp portion 115 that includes a plurality of upraised finger members 121, 123, and 125. Finger members 121, 123, and 125 extend up from base portion 113 at a selected angle A from structure 119. In the preferred embodiment, angle A is about 25°. Finger members 121, 123, and 125 extend up in a co-planar fashion for a short distance, and then finger members 121 and 123 transition into downward facing curves, while finger member 125 transitions into an opposing upward facing curve. These opposing curves form a channel 127 that is configured to releasably receive insert member 129. Opposing finger members 121, 123, and 125 act as springs to secure insert member 129 in place. Although channel 127 does not have a completely circular cross section, channel 127 has a minimum clearance C. This configuration ensures that a fire detector wire 128, which is secured within insert member 129, does not come into direct contact with structure 119.

Clip member 111 is preferably manufactured from a metallic material with sufficient elastic properties to perform the desired spring functions. In the preferred embodiment, at least base portion 113 is coated with, or otherwise treated, with a lubricant to prevent fretting between base portion 113 and structure 119.

Figure 1A:
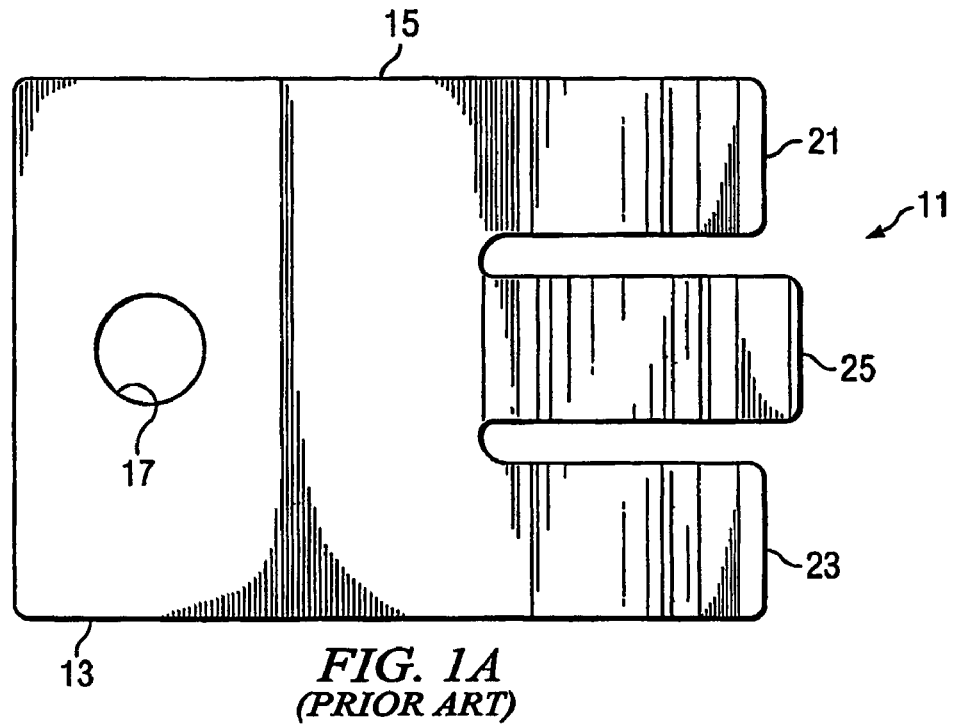
FIG. 1A is a top view of a prior-art clip for a fire detector clip.
Figure 1B:
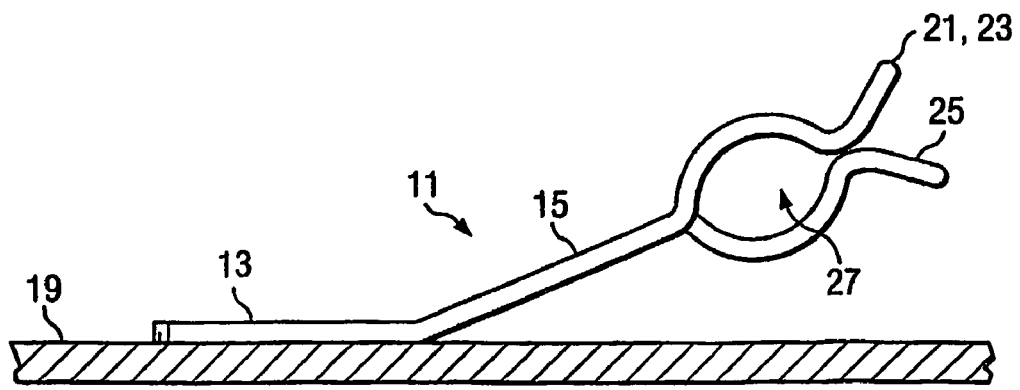
FIG. 1B is a front view of the prior-art clip of FIG. 1A.
Figure 2:
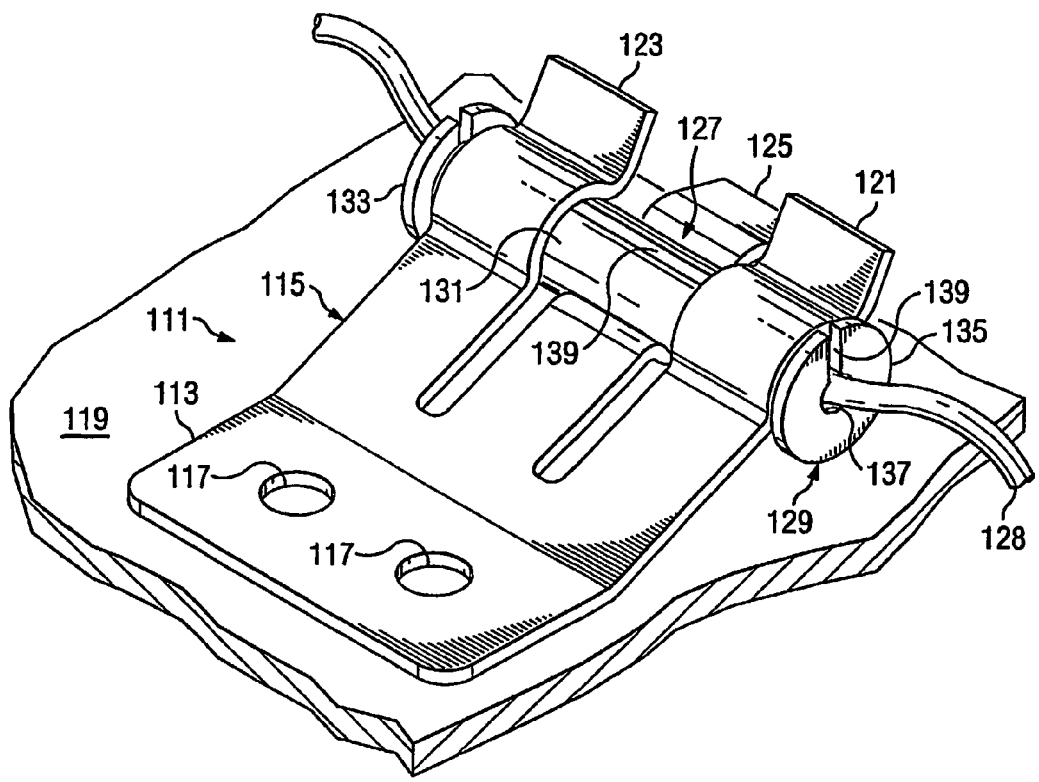
FIG. 2 is an assembled perspective view of the clip for fire detector wire according to the present invention.

Referring now to FIG. 2 and FIGS. 6 and 7 in the drawings, insert member 129 is illustrated in a front view and an end view, respectively. Insert member includes an elongated shaft portion 131 that terminates with flanges 133 and 135 on the opposing ends. Insert member 129 includes an axial central channel 137 that extends along the entire length of insert member 129. Although central channel 137 is shown having a circular cross-sectional geometry, it should be understood that the geometric cross-sectional shape of central channel may be other than circular to accommodate the cross-sectional shape of fire detector wire 128. A longitudinal slot 139 extends along the entire length of insert member 129, and allows access to central channel 137. Fire detector wire 128 is inserted into slot 139 and pressed into central channel 137. In the preferred embodiment, the width T of slot 139 is smaller than the diameter of central channel 137. This configuration facilitates the securing of fire detector wire 128 within central channel 137.

Shaft portion has a length L between flanges 133 and 135 that is dimensioned to correspond to a width W between the outside edges of finger members 121 and 123. This ensures that flanges 133 and 135 remain on the outside of finger members 121 and 123, and that insert member 129 does not move axially while held in place between finger members 121, 123, and 125. In addition, shaft portion has an outside diameter D between flanges 133 and 135 that Is dimensioned to correspond to clearance C between the curves formed by finger members 121, 123, and 125, such that a small compressive load is exerted upon insert member 129 by finger members 121, 123, and 125.

In the preferred embodiment, insert member 129 is made of polytetrafluoroethylene. However, it should be understood that in alternate embodiments other suitable anti-friction materials may be used, or insert member 129 may be manufactured from other materials, covered with, coated with, or otherwise treated with polytetrafluoroethylene or any other suitable anti-friction material.

In operation, clip member 111 is secured to structure 119 by passing conventional fasteners through mounting apertures 117. Then, fire detector wire 128 is inserted through slot 139 into central channel 137 of insert member 129. Insert member 129 and fire detector wire 128 are then snapped into channel 127 of clip member 111. No other clamping, fastening, hinging, or adjusting is required.

The multiple fasteners prevent clip member 111 from rotating relative to structure 119 due to vibration of the aircraft. This prevents crimping and chafing of fire detector wire 128. Insert member 129 is held in place by flanges 133 and 135. This further prevents chafing of fire detector wire 128.

The present invention provides significant benefits and advantages, including: (1) the clip does nor rotate relative to the aircraft structure when subjected to vibration, thereby preventing crimping and chafing of the fire detector wire; (2) the anti-friction insert member prevents chafing of the fire detector wire; and (3) the end flanges of the insert member retain the insert member in the proper position between the opposing fingers of the clamp member.

It is apparent that an invention with significant advantages has been described and illustrated. Although the present invention is shown in a limited number of forms, it is not limited to just these forms, but is amenable to various changes and modifications without departing from the spirit thereof.

The invention claimed is:

1. A clip for mounting a fire detector wire to a structure comprising:
   a clip member comprising:
      a base portion adapted for mounted to the structure;
      at least two mounting apertures passing through the base portion; and
      a clamp portion upraised from the base portion having opposing spring action finger members;
   an anti-friction insert member adapted to carry the fire detector wire comprising:
   an elongated shaft portion;
   an axial central channel for receiving the fire detector wire;
   a longitudinal slot for allowing access to the central channel; and
   a flange on each end of the elongated shaft;
   wherein the insert member is configured to be releasably clamped between the finger members, the flanges preventing axial movement of the insert member relative to the finger members.

2. The clip according to claim 1, wherein the spring action finger members include opposing curves that define a channel configured to clampingly receive the insert member.

3. The clip according to claim 1, wherein the insert member is made of polytetrafluoroethylene.

4. The clip according to claim 1, further comprising:
   a lubricant disposed between the base portion and the structure.

5. The clip according to claim 1, wherein the flanges abut the finger members.

6. The clip according to claim 1, wherein the clip is operably associated with the structure.

7. The clip according to claim 1, wherein the clip is operably associated with an aircraft.

8. The clip according to claim 1, wherein the fire detector wire is disposed in the axial central channel.

9. The clip according to claim 8, wherein the clip is operably associated with the structure.

10. The clip according to claim 8, wherein the clip is operably associated with an aircraft.

11. A clip for mounting a fire detector wire to a structure, comprising:
- a clip member comprising:
  - a base portion defining at least two mounting apertures; and
  - a clamp portion upraised from the base portion at an angle of about 155 degrees, the base portion having opposing spring action finger members; and
- an anti-friction insert member comprising polytetrafluoroethylene being releasably disposed in the clamp portion, the anti-friction insert member comprising:
- an elongated shaft portion;
- an axial central channel for receiving the fire detector wire;
- a longitudinal slot extending from an outer surface of the anti-friction insert member to the axial central channel for allowing access to the central channel; and
- a flange extending from each end of the elongated shaft, the flanges abutting the finger members.

12. The clip according to claim 11, wherein the clip is operably associated with the structure.

13. The clip according to claim 11, wherein the clip is operably associated with an aircraft.

14. The clip according to claim 11, wherein the fire detector wire is disposed in the axial central channel.

15. The clip according to claim 14, wherein the clip is operably associated with the structure.

16. The clip according to claim 14, wherein the clip is operably associated with an aircraft.

* * * * *